Oct. 17, 1967     R. H. MURPHY     3,347,275

RACEWAY

Filed Oct. 7, 1965

INVENTOR.
Robert H. Murphy
BY his attorneys

Howson and Howson.

United States Patent Office 3,347,275
Patented Oct. 17, 1967

3,347,275
RACEWAY
Robert H. Murphy, West Hartford, Conn., assignor to The Wiremold Company, West Hartford, Conn., a corporation of Connecticut
Filed Oct. 7, 1965, Ser. No. 493,749
17 Claims. (Cl. 138—116)

ABSTRACT OF THE DISCLOSURE

Electric wiring raceway structure having two separated parallel raceways, constructed of one piece of metal, or from two pieces, in channel form. In the two-piece form the second channel fits within and strengthens the first. In both, the top edges are provided with an inwardly extending bead and an outward flange; and the junction of the side walls with the bottom wall has an outwardly folded flange, all of which contribute to form a rigid structure resistant to bending and twisting.

This invention relates to raceways for electric wiring. More particularly, the invention relates to raceways which are substantially rigid and which have optimum resistance to bending and twisting of the raceway which frequently occurred heretofore while the raceway was being installed.

It is an object of the invention to provide an improved substantially rigid raceway structure for electric wiring which may be formed from sheet metal or other suitable material capable of being folded, bent or formed into a shape. A related object is to provide such a raceway having optimum resistance, particularly during installation, to bending and twisting and having upper and lower (or inner and outer) raceways for power and branch circuits or the like.

Another object is to provide a raceway of the above type which may be made of two pieces of sheet metal which are formed to cooperate and are joined together without the need of welding.

Another object of the invention is to provide a raceway as above described which may be made from one piece of sheet metal which requires welding along no more than one seam.

Another object of the invention is to provide raceway structures achieving the above objectives which are adapted to have covers snapped into place thereon.

Another object of the invention is to provide a coupling for raceways having the aforementioned characteristics so that two similar sections of such raceways may be joined without exposing the wires which are contained within the compartments of the raceway.

Other objects and advantages of the invention will appear as the invention is described in connection with the accompanying drawing.

Figure 1:
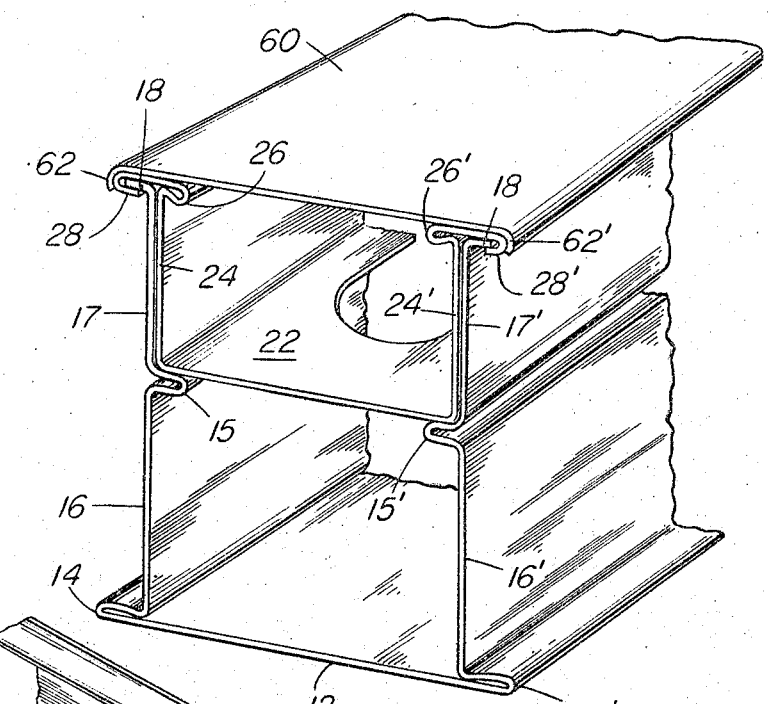
FIG. 1 is a perspective view of a raceway formed of two parts and embodying the invention.

Referring to the drawing, the raceway is formed from flat sheet metal or other suitable material by bending and forming or other operations to create a lower base member of deep channel shape having a flat bottom or transverse wall 12 whose edges are reversely bent forming flattened beads 14, 14' running lengthwise with parallel side walls extending upwardly therefrom perpendicular to the bottom wall. The side walls are inwardly folded at their middle forming opposite ribs 15, 15' running lengthwise and dividing the side walls into upper and lower parts 16, 16' and 17, 17'. The top edges of the upper side walls 17, 17' are out-turned at right angles in opposite directions forming flanges 18, 18'.

To make the lower base member more rigid so it will strongly resist and prevent twisting and bending and to divide the lower base member into upper and lower parallel compartments, an upper base member is formed from sheet metal into generally channel shape less deep than the lower base member. The bottom of the transverse portion 22 of this upper base member is parallel to the bottom of the lower base member and has parallel side walls 24, 24' rising perpendicular to it in position to lie flat against the upper side walls 17, 17' of the lower base member. The upper edges of the side walls 24, 24' are reversely bent inwardly forming inwardly extending flat beads 26, 26' opposite the flanges 18, 18'.

The upper edges of the beads 26, 26' are extended outwardly parallel to the bottom walls 12, 22 and over the flanges 18, 18' and then bent around the edges of flanges 18, 18' and under them to form jaws 28 whereby the flanges are gripped and tightly held by the jaws. In this fashion the outer side walls 17, 17' are integrated to the dividing wall 22.

On top of the upper and lower base members assembled as just described, a flat cover member 60 may be fitted. The cover member comprises a strip from sheet metal having its edges bent to form curved margins 62, 62' running lengthwise of the cover and adapted to embrace the jaws 28 of the upper base member when the cover is assembled upon the base. The cover is of sheet metal which is sufficiently thin and flexible to permit it to be snapped into place by placing one edge around the jaw on one side of the base and then exerting pressure upon the opposite edge to cause it to snap around and remain in engagement with the opposite side of the base.

Figure 2:
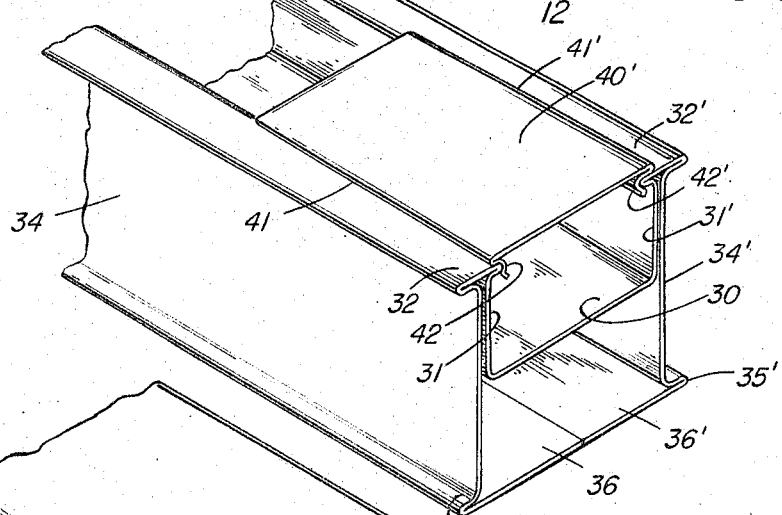
FIG. 2 is a perspective view of another form of raceway formed from a single piece of metal with only one welded joint.

In FIG. 2, another form of raceway also designed to provide rigidity and optimum resistance to twisting and bending and turning is shown. In this case, a strip of sheet metal is bent and formed to provide an interior flat middle wall 30 extending lengthwise of the raceway. From the side edges of this middle wall, parallel inner side walls 31, 31' rise perpendicularly. These side walls at their upper edges are reversely bent, first inwardly and upwardly and then back toward the walls 31, 31'. Thus, flattened beads 32, 32' are formed.

As the reverse or under portion of the beads approach the walls 31, 31', they are bent at right angles downwardly away from the beads parallel and adjacent to the inner side walls 31, 31' forming outer parallel side walls 34, 34' of the raceway.

The outer side walls 34, 34' at their bottom edges are bent outwardly and reversely perpendicularly to their planes forming bottom flanges 35, 35'. The return portions of the reverse bends which form the flanges 35, 35' are extended inwardly to meet at the center line of the raceway in a common plane to form the bottom wall of the raceway.

The abutting edges of the two halves of the bottom wall 36, 36' are welded to make a rigid one-piece raceway structure.

A cover 40' for the raceway is formed by folding over longitudinally, as at 41, 41', a strip of metal or other suitable stiff resilient material along parallel lines near its edges and bending the folded-over edges away from the plane of the strip in an S-curve to form jaws 42, 42'. The cover and jaws are sufficiently flexible to permit the cover to be snapped in place as shown. This may be done after one jaw is engaged with the flat beads (such as 32)

and the cover is pressed toward the raceway to cause the other edge to snap into engagement with the other bead (such as 32′).

The structures as described in connection with FIGS. 1 and 2 form a rigid raceway structure with an interior dividing wall joined to and formed integrallyy with interior side walls which, in turn, are affixed to outer side walls that connect with a bottom wall; and the interior and exterior side walls are joined by a connection having an exterior flange and an interior bead which together provide stiffness and rigidity at the top or open face of the raceway while similar flanges at the juncture of the side and bottom walls of the raceway afford similar stiffness and rigidity at the bottom corners of the raceway.

The corner structures prevent bending in a horizontal direction while the side walls prevent bending in a vertical direction (referring to the invention as oriented in the drawing). The middle interior wall prevents inward bending of the side walls toward each other and lateral bending of the raceway. All said structural features combine to prevent twisting.

In the FIG. 1 form, the ribs 15, 15′ afford additional structural resistance to both horizontal and vertical bending.

In the FIG. 2 structure, the raceway is made from one sheet of metal. In the FIG. 1 structure, two pieces of metal are used, but the need to weld the bottom wall of the raceway lengthwise is avoided.

In both forms as described, parallel upper and lower compartments are provided for electric wires of different circuits which must be physically separated from one another.

Figure 3:
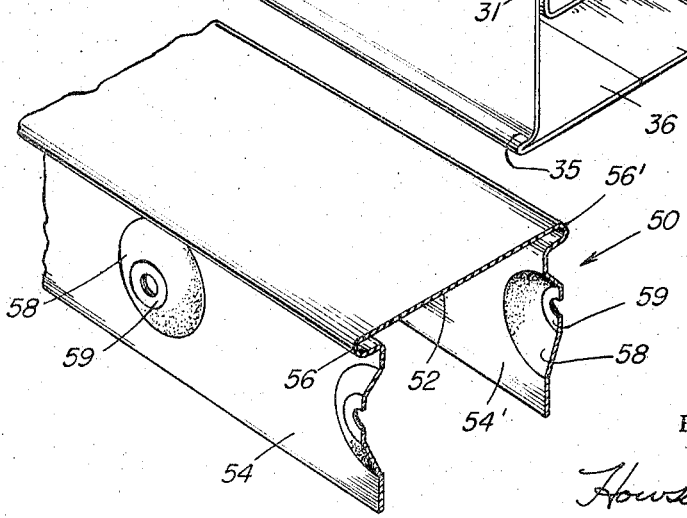
FIG. 3 is a perspective view of a coupling member which may be used to join sections of the raceways of either FIG. 1 or FIG. 2.

To join adjacent sections of the forms of raceway of either FIG. 1 or FIG. 2, a coupling as illustrated in FIG. 3 may be employed. This coupling comprises a sheet metal stamping 50 bent into U-shape with a top wall 52 joined to parallel side walls 54, 54′ by a hollow bead 56, 56′ in the form of an inwardly open reverse bend at the juncture of the side walls and the top wall. The side walls 54 are spaced apart by an inside dimension equal to the outside dimension of spacing of side walls 34, 34′, or 17, 17′.

The dimensions of curvature and spacing of the inside of the beads 56, 56′ should be made such that the beads will embrace the flanges (28, 28′ of FIG. 1 or 32, 32′ of FIG. 2) when the coupling is applied to adjacent ends of sections of whichever form of raceway structure is to be joined.

To secure the coupling to the walls of the adjacent raceway sections, dome-shaped extrusions 58 are pressed out of the plane of the side walls 54, 54′, there being two such extrusions in each side wall of the coupling. Each extrusion is pierced as at 59 and tapped with internal screw threads to receive securing screws (not shown) whose ends can be made to press with considerable force against the side walls (34, 34′ or 17, 17′, as the case may be) and hold adjacent sections of the raceway firmly together as the screws are tightened.

In the description and claims, references to bottom, top and sides are in connection with structures as oriented in the drawings and such references are in no sense limitations on the invention.

Modifications within the scope of the invention will occur to those skilled in the art. Therefore, the invention is not limited to the precise forms illustrated and described.

What is claimed is:

1. A raceway for electric wiring comprising a single piece of material forming an element having a channel shape with parallel side walls joined by an outer transverse wall, a second element formed of one piece of metal bent into channel shape and fitting within said first element, said second element having parallel side walls lying flat against the side walls of said first element and joined by an inner transverse wall spaced from the outer transverse wall of the first element dividing the first element into inner and outer compartments each adapted to receive electrical conductors, the edges of the side walls of the first element being outturned, the edges of the sidewalls of the second element having outwardly extending flanges reversely bent to embrace the outturned edges of the first element and stiffen it, and a cover member engaging the edges of the second element and enclosing said outer compartment.

2. A raceway as claimed in claim 1 wherein said second element is formed with means including internal beads running throughout its length along its edges.

3. A raceway as claimed in claim 1 wherein said first element is formed with external flanges adjacent the junctures of its side walls and bottom wall running throughout its length.

4. A raceway for electric wiring comprising a single piece of material forming an element having a channel shape with parallel side walls joined by an outer transverse wall, a second element formed of one piece of metal bent into channel shape and fitting within said first element, said second element having parallel side walls lying flat against the side walls of said first element and affixed to them and joined by an inner transverse wall spaced from the outer transverse wall of the first element dividing the first element into inner and outer compartments, parallel opposite internal ribs running along the side walls of said first element and spaced from said outer transverse wall with said inner transverse wall of the second element resting on said ribs providing a separate raceway compartment on each side of said inner transverse wall.

5. A raceway as claimed in claim 4 wherein said first element is formed with external flanges adjacent the junctures of its side walls and bottom wall running throughout its length.

6. A raceway as claimed in claim 5 wherein said first element has a flange at the free edge of each of its side walls.

7. A raceway as claimed in claim 4 wherein said first element has a flange at the free edge of each of its side walls.

8. A raceway for electric wiring comprising a single piece of material forming an element having a channel shape with parallel side walls joined by an outer transverse wall, a second element formed of one piece of metal bent into channel shape and fitting within said first element, said second element having parallel side walls lying flat against the side walls of said first element and affixed to them and joined by an inner transverse wall spaced from the outer transverse wall of the first element dividing the first elements into inner and outer compartments, external flanges formed adjacent the junctures of the side walls and bottom wall of said first element running throughout its length, and a flange at the free edge of each of the side walls of the first element and an external flange running along the length of the second element interlocked with the free edge flange of said first element.

9. A raceway as claimed in claim 8 wherein said first element has parallel opposite internal ribs running along its side walls and spaced from said outer transverse wall with said inner transverse wall of the second element resting on said ribs providing a separate raceway compartment on each side of said inner transverse wall.

10. A raceway for electric wiring formed from sheet metal having parallel outer side walls formed as one piece with an outer transverse wall and having an external flange formed at the juncture of said outer transverse wall with each side wall, said outer side walls having longitudinal edges out-turned forming flanges, means extending transversely between said side walls parallel to said outer transverse wall dividing the raceway into two compartments, and means integrating said dividing means with said outer walls and connecting the dividing means with said external flanges.

11. In combination with adjacent sections of a raceway as claimed in claim 10, a member connecting said sections comprising parallel side walls lying against the outer surfaces of said outer side walls, a transverse wall joining and integral with said side walls, the connections of the side walls of said connecting member being outwardly curved and embracing said integrating means.

12. The combination as claimed in claim 11 having pierced extrusions in the side walls of said connecting member, and securing screws passing through said extrusions and engaging said sections to secure said sections and connecting member together.

13. A raceway as claimed in claim 10 formed from one piece of material.

14. A raceway as claimed in claim 13 wherein the edges of the material from which the raceway is formed abut in a seam extending lengthwise along said outer transverse wall and are welded therealong.

15. A raceway for electric wiring formed from sheet metal having parallel outer side walls formed as one piece with an outer transverse wall and having an external flange formed at the juncture of said outer transverse wall with each side wall, an inner transverse wall extending between said outer side walls spaced from said outer transverse wall and dividing the raceway into compartments, inner side walls integral with said inner transverse wall and parallel to and flush against said outer side walls, internal flattened beads running along the edges of said internal walls, and out-turned flanges opposite and running parallel to said internal beads.

16. In combination with adjacent sections of a raceway as claimed in claim 15, a member connecting said sections comprising parallel side walls lying against the outer surfaces of said outer side walls, a transverse wall joining and integral with said side walls, the connections of the side walls of said connecting member being outwardly curved and embracing the out-turned flanges which are opposite said internal beads.

17. A raceway for electric wiring formed from sheet metal having parallel outer side walls formed as one piece with an outer transverse wall and having an external flange formed at the juncture of said outer transverse wall with each side wall, said outer side walls having longitudinal edges out-turned forming flanges, an inner transverse wall parallel to said outer transverse wall and dividing the raceway into two compartments, inner side walls integral with said inner transverse wall paralleling said outer side walls and adjacent to them, said inner side walls being integrated to said outer side walls and connecting with them at a longitudinally extending bead.

References Cited
UNITED STATES PATENTS

| | | |
|---|---|---|
| 800,054 | 9/1905 | Ayres. |
| 2,090,239 | 8/1937 | Strang _____ 174—101 X |
| 2,445,198 | 7/1948 | Wiesmann _____ 174—68 X |

FOREIGN PATENTS

| | | |
|---|---|---|
| 490,678 | 2/1954 | Italy. |
| 1,353,504 | 1/1964 | France. |

LARAMIE E. ASKIN, *Primary Examiner.*